UNITED STATES PATENT OFFICE.

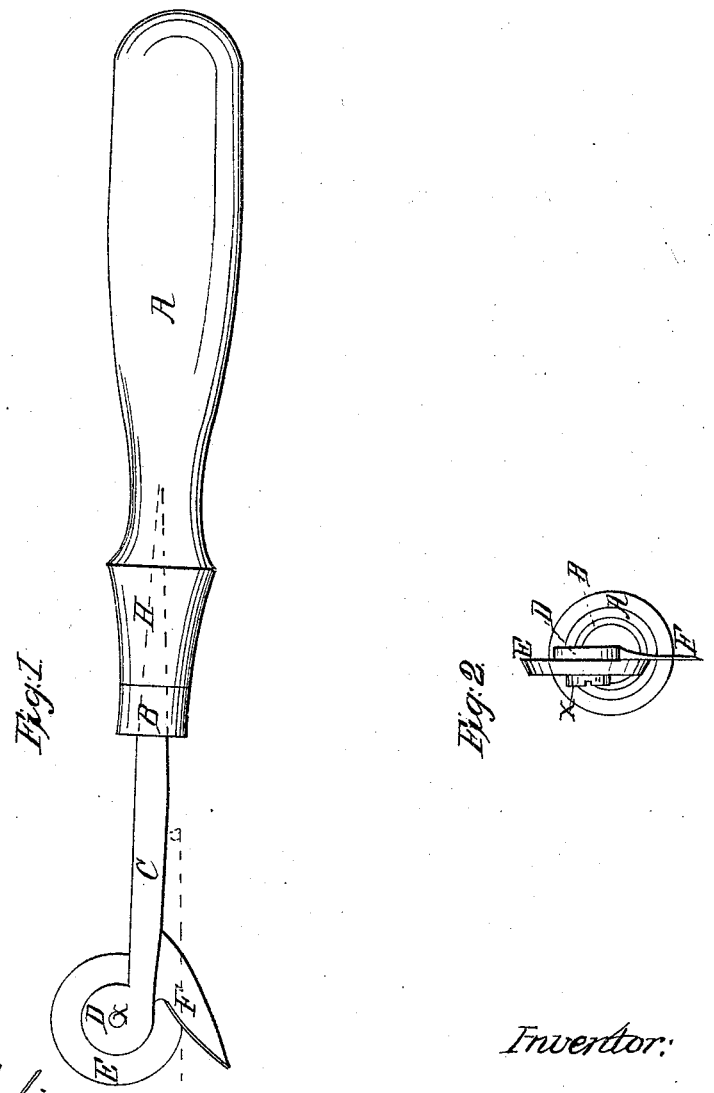

EBEN T. ORNE, OF CHICAGO, ILLINOIS.

IMPROVED TIN-CAN OPENER.

Specification forming part of Letters Patent No. 53,173, dated March 13, 1866.

*To all whom it may concern:*

Be it known that I, EBEN T. ORNE, of the city of Chicago, county of Cook, and State of Illinois, have invented an Improved Tin-Can Opener; and I do hereby declare that the following is a full and exact description of the same, reference being had to the accompanying drawings and letters of reference marked thereon, making a part of this specification, in which—

Figure 1 is a longitudinal elevation of my improved tin-can opener. Fig. 2 is an end elevation of the same.

The object of my invention is to provide a convenient and substantial device for opening any metallic can commonly used for preserving fruits and meat, and for other purposes where an opening in thin metallic plates is required to be made.

I am well acquainted with the forked can-opener and other devices used for opening cans, and find none to be convenient nor safe in the hands of unskillful operators.

I claim by the use of my device to have obviated the above-named difficulties by providing a can-opener that cuts so easily as not to endanger the hand of the operator while cutting the can in any desired manner.

To enable others skilled in the art to make and use my invention, I will describe the method of constructing and using the same.

A represents a common wooden handle supporting the band B.

C represents the shank driven into the handle A, as shown by the dotted lines H.

F represents the lower stationary cutter, forged out of the shaft C in the form of a shear-point.

D represents a circular plate forged out of the shank C, above which the larger part projects. The object of the plate D is to form a support for the revolving shear E.

X shows the screw, similar to that used in the common shears for holding the blades together, and extending through the shear E and plate D.

The outside of the shear E is beveled so as to form an edge which operates against the lower cutter, F, when cutting the metallic plate. This sharp-edged revolving shear E and cutter F obviate the necessity of levers, and also constitute a simple and effectual means for cutting openings in any kind of thin metallic plate.

The material used in the manufacture is the best of cast-steel, and the cutter E and the revolving shear E are tempered in the usual manner for cutting metals.

Operation: The red line *o o* represents the surface of the can to be cut. The handle A is grasped with one hand while the other holds the can, and the point of the cutter E is thrust through the plate of the can, so that the revolving shear E may strike the plate of the can, as shown by the line *o o*, referred to. Then force the can-opener forward in a manner to suit the form of the opening required in the can.

Having thus described my invention, what I claim as new in my device, and desire to secure by Letters Patent of the United States, is—

The sharp-edged revolving shear E, in combination with the stationary cutter F, when constructed as described and operated for the purpose set forth.

EBEN T. ORNE.

Witnesses:
GEO. L. CHAPIN,
ALBERT HAYWARD.